United States Patent [19]

Takano

[11] Patent Number: 5,051,817
[45] Date of Patent: Sep. 24, 1991

[54] SUPERIMPOSING SYSTEM

[75] Inventor: Toshiki Takano, Kyoto, Japan

[73] Assignee: Rohm Co., Ltd., Kyoto, Japan

[21] Appl. No.: 437,426

[22] Filed: Nov. 16, 1989

[30] Foreign Application Priority Data

Nov. 18, 1988 [JP] Japan ................................. 63-292641
Nov. 30, 1988 [JP] Japan ................................. 63-304995
Sep. 29, 1989 [JP] Japan ................................. 1-256437
Oct. 18, 1989 [JP] Japan ................................. 1-272053

[51] Int. Cl.$^5$ ............................................. H04N 9/76
[52] U.S. Cl. ........................................ 358/22; 358/19
[58] Field of Search ................................... 358/19, 22

[56] References Cited

U.S. PATENT DOCUMENTS 4,561,013 12/1985 Fukui et al. ........................ 358/22
4,639,765 1/1987 D'Hont .............................. 358/22

Primary Examiner—John W. Shepperd
Attorney, Agent, or Firm—Lowe, Price, LeBlanc and Becker

[57] ABSTRACT

A system for superimposing color characters on video reproduction signals. A character signal is modulated by a color subcarrier phase-locked to a burst signal of video reproduction signal, and the display position of each line is controlled by the pulse obtained on the basis of the horizontal synchronizing signal of the video reproduction signal. A desired color character can be superimposed on a video reproduction signal without drift of the character.

12 Claims, 16 Drawing Sheets

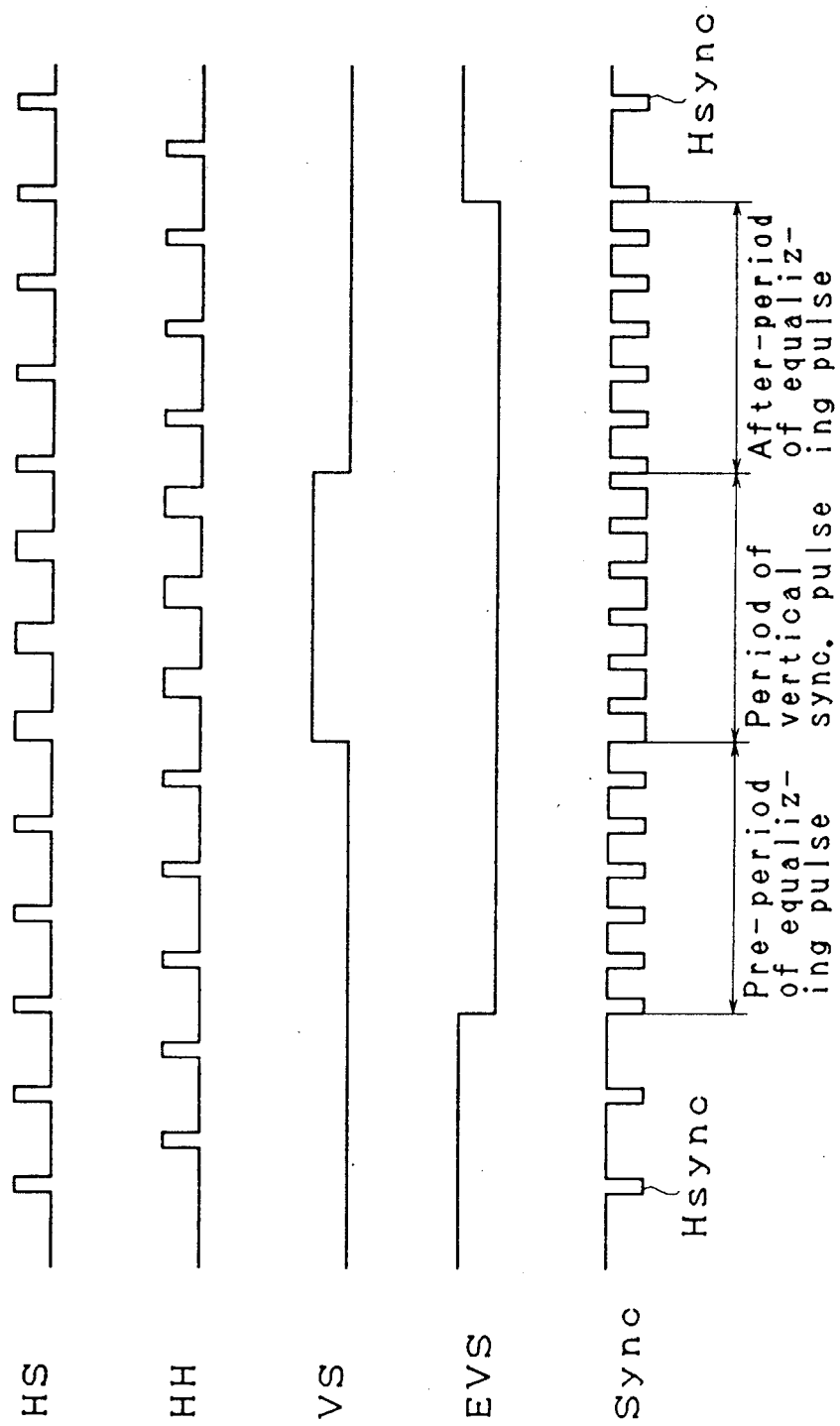

FIG. 15
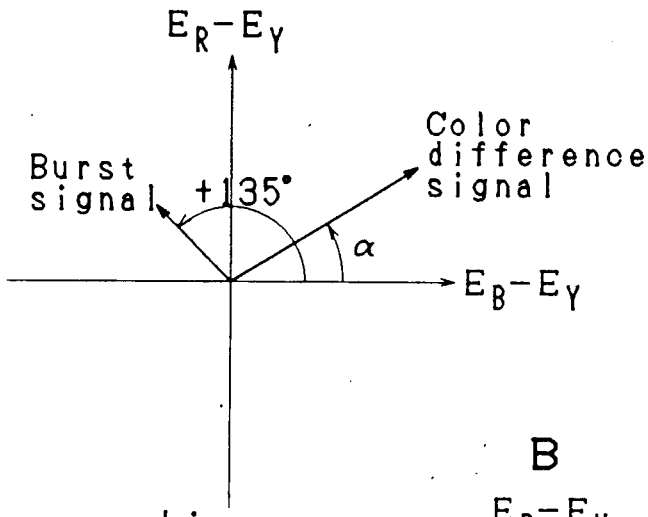
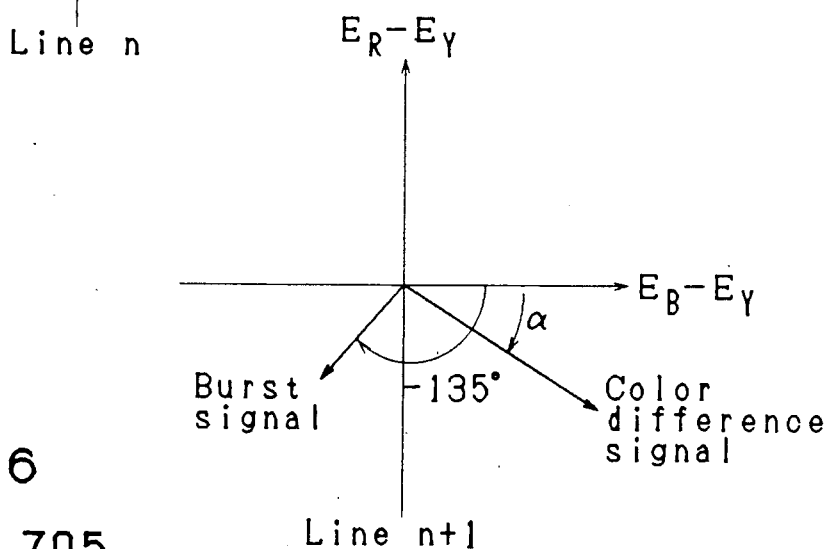
FIG. 16
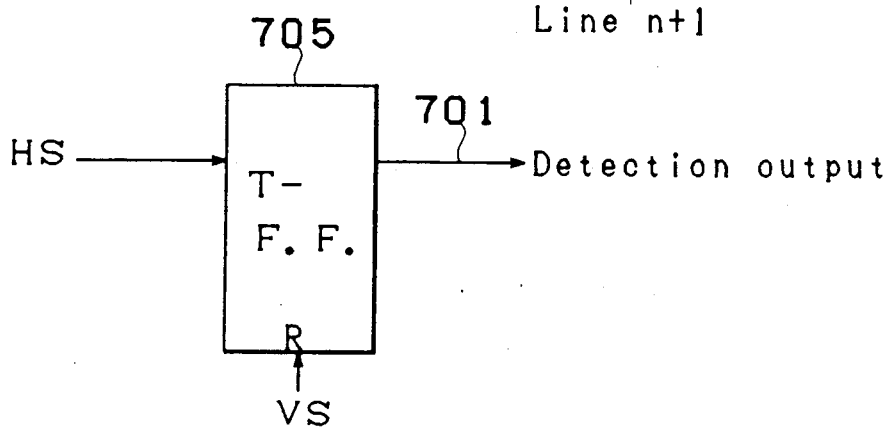

5,051,817

SUPERIMPOSING SYSTEM

BACKGROUND OF THE INVENTION

1. Field of the Invention

The present invention relates to a system for superimposing color characters or the like on nonstandard signals such as video reproduction signals.

2. Description of the Prior Art

For example, while reproducing a video tape, a remainder of the tape or other information may be displayed on a screen. This display is effected by superimposing a character signal on a video signal of NTSC, PAL or other system reproduced by a video deck. Hitherto, when combining the video signal being reproduced and a character signal desired to be added, a circuit as shown in FIG. 1 was used. The video signal is given to an analog switch 2, and a character signal is fed to an analog switch 4. Changeover signal is applied to both analog switches 2 and 4. When the changeover signal is at low level, the video signal is delivered, and when at high level, the character signal is delivered. Therefore, at the timing of insertion of character signal, by setting the changeover signal to high level, a superimposed video signal is obtained. For example, when a character signal is shown in FIG. 2B is added to a reproduction video signal as shown in FIG. 2A, a superimposed video signal as shown in FIG. 2C is obtained. When this video signal is displayed, a white character is superimposed and displayed in the video image. In FIG. 2A, meanwhile, numeral 6 denotes a horizontal synchronizing signal, and numeral 8 denotes a burst signal.

However, in such superimposing circuit, only the luminous component is contained in the added signal. Therefore, only white, black or gray characters can be superimposed.

Another problem in superimposing is that a video signal reproduced by VTR or a video signal of a household computer is a nonstandard signal having the frequency ratio of a burst signal to a horizontal sync. pulse deviated from the standard of NTSC, PAL and others. When superimposing on such nonstandard video signal, following problem occurs. When a display position of a superimposing character is determined by using the burst signal of nonstandard video signal as the reference clock, undesirable drift (jitter) is caused in the superimposed character.

Further, there is some case that only the added signal is displayed without the video signal. In this case, therefore, since the signal necessary for the sync. pulse or the like is not fed, the added signal cannot be displayed.

SUMMARY OF THE INVENTION

It is a primary object of the present invention to present a system capable of superimposing color characters in a video deck or the like.

It is another object of the present invention to present a system capable of superimposing desired color characters or the like without jitter in a video deck or the like.

It is a further object of the present invention to present a system capable of superimposing an added signal even when a video signal is not fed.

A superimposing system in accordance with the present invention comprises:

a first oscillation circuit for generating a free-running oscillation output when burst signal of video signal is not fed, and generating an oscillation output, when burst signal of video signal is fed, phase-locked to the burst signal, a second oscillation circuit for generating an output where frequency divided signal of the output is phase-locked to the horizontal synchronizing signal of video signal, a modulator for modulating an added signal, using the output of the first oscillation circuit as a color subcarrier, reference clock selecting means for selecting the output of the second oscillation circuit as reference clock when superimposing, and selecting the output of the first oscillation circuit as reference clock when not superimposing, a foundation signal generating circuit for generating burst signal, horizontal synchronizing signal and vertical synchronizing signal on the basis of the free-running oscillation output of the first oscillation circuit when displaying only the added signal, a display timing circuit for controlling the display position of the added signal on the basis of the reference clock, and means for changing over the modulated added signal and video signal.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 15 (A and B) is signal vector diagrams showing features of PAL system signal.

FIG. 16 is a circuit diagram showing details of a line counter.

DETAILED DESCRIPTION

NTSC System

Figure 3:
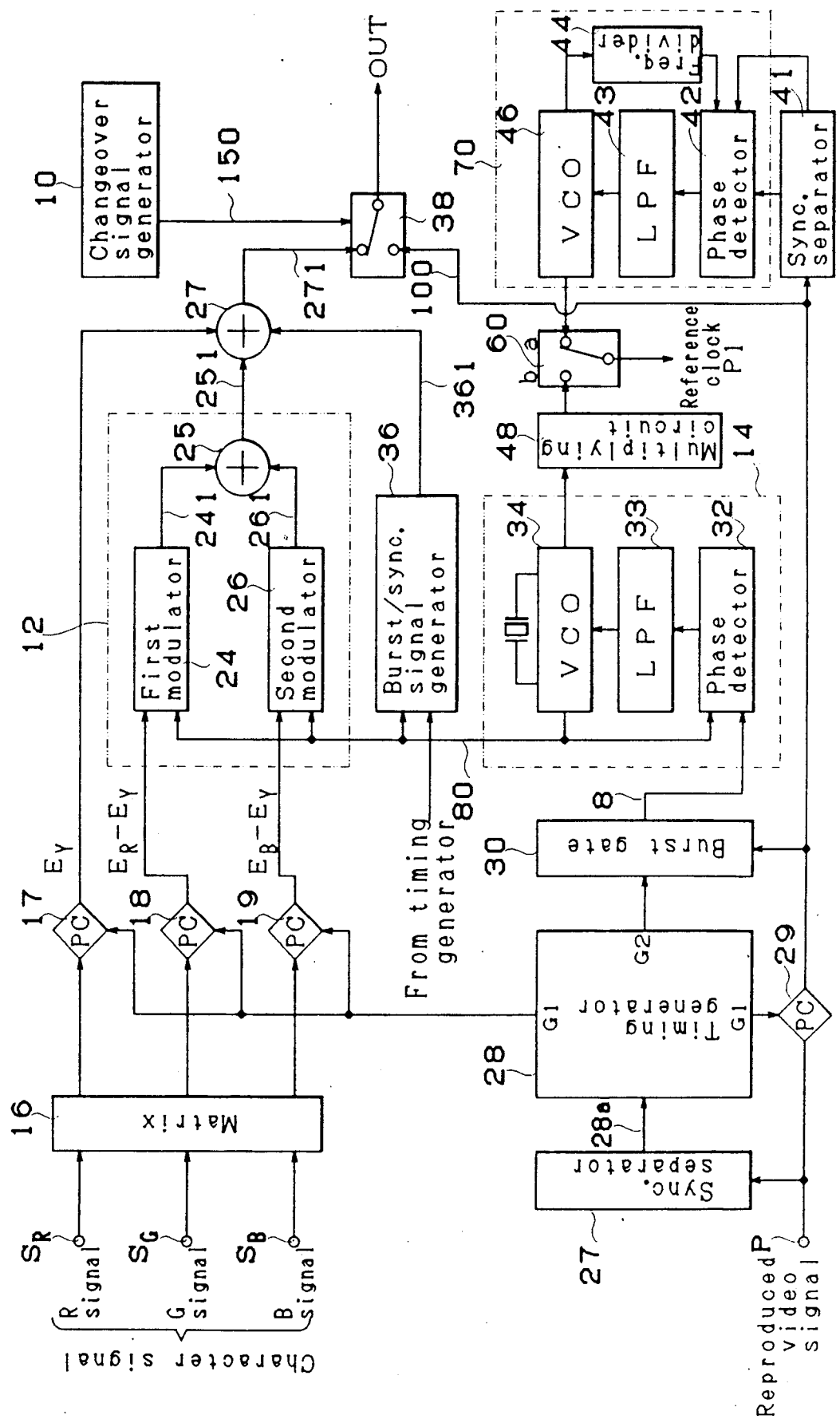
FIG. 3 is a block diagram of a superimposing system of NTSC system embodying the present invention.

FIG. 3 shows a superimposing system of NTSC system according to one of the embodiments of the present invention. In this circuit, the operation of superimposing is described in the first place.

Superimposing Mode

A reproduced video signal is fed into a video input terminal P, and a character signal to be superimposed is fed into input terminals $S_R$, $S_G$, $S_B$. The character signal to be added is composed of R signal, G signal and B signal of the primary colors. These R signal, G signal and B signal are converted into luminance signal $E_Y$, color difference signal $E_R-E_Y$, and color difference signal $E_B-E_Y$ in a matrix 16 as an added color difference signal generating circuit. The luminance signal and the color difference signals are adjusted of the pedestal level by pedestal clamp circuits 17, 18 and 19.

On the other hand, the video signal reproduced by a magnetic head is adjusted of level by a pedestal clamp 29, and is given to a changeover circuit 38 as changeover means. From this video signal a horizontal sync. pulse $H_{sync}$ is separated in a sync. separator 41, and is given to a phase detector (phase comparator) 42 of a PLL circuit 70 as a second oscillator. The PLL circuit 70 comprises a voltage controlled oscillator 46, a low pass filter 43, a phase detector 42, and a frequency divider 44. The oscillation output frequency of the voltage controlled oscillator 46 is divided in two 455 times by the frequency divider 44, and is applied to the phase detector 42. Therefore, the voltage controlled oscillator 46 generates an output which is synchronized with the horizontal sync. pulse $H_{sync}$, and has a frequency 455 times the frequency $f_H$ of the horizontal sync. pulse $H_{sync}$. That is, an oscillation output having the frequency twice as high as the frequency $f_{sc}$ of a color subcarrier is generated by the PLL circuit 70 (in the case of standard signal, the relation of $f_{sc}=(455/2).f_H$ is established).

The oscillation output of the PLL circuit 70 is given to a selector switch 60 as a reference clock selecting means. When superimposing, the selector switch 60 is connected to the side of a. Therefore, the output of the PLL circuit 70 is selected as reference clock P1.

On the other hand, the video signal is separated only of the sync. signal in the sync. separator 27, and is given to the timing generator 28.

The timing generator 28 is provided to generate necessary pulses for video display such as a timing of burst signal. To the timing generator, the sync. pulses from the sync. separator 28 and the reference clock P1 are given. The details of the circuit of the timing generator 28 are shown in FIGS. 4A, 4B and 4C.

Figure 4A:
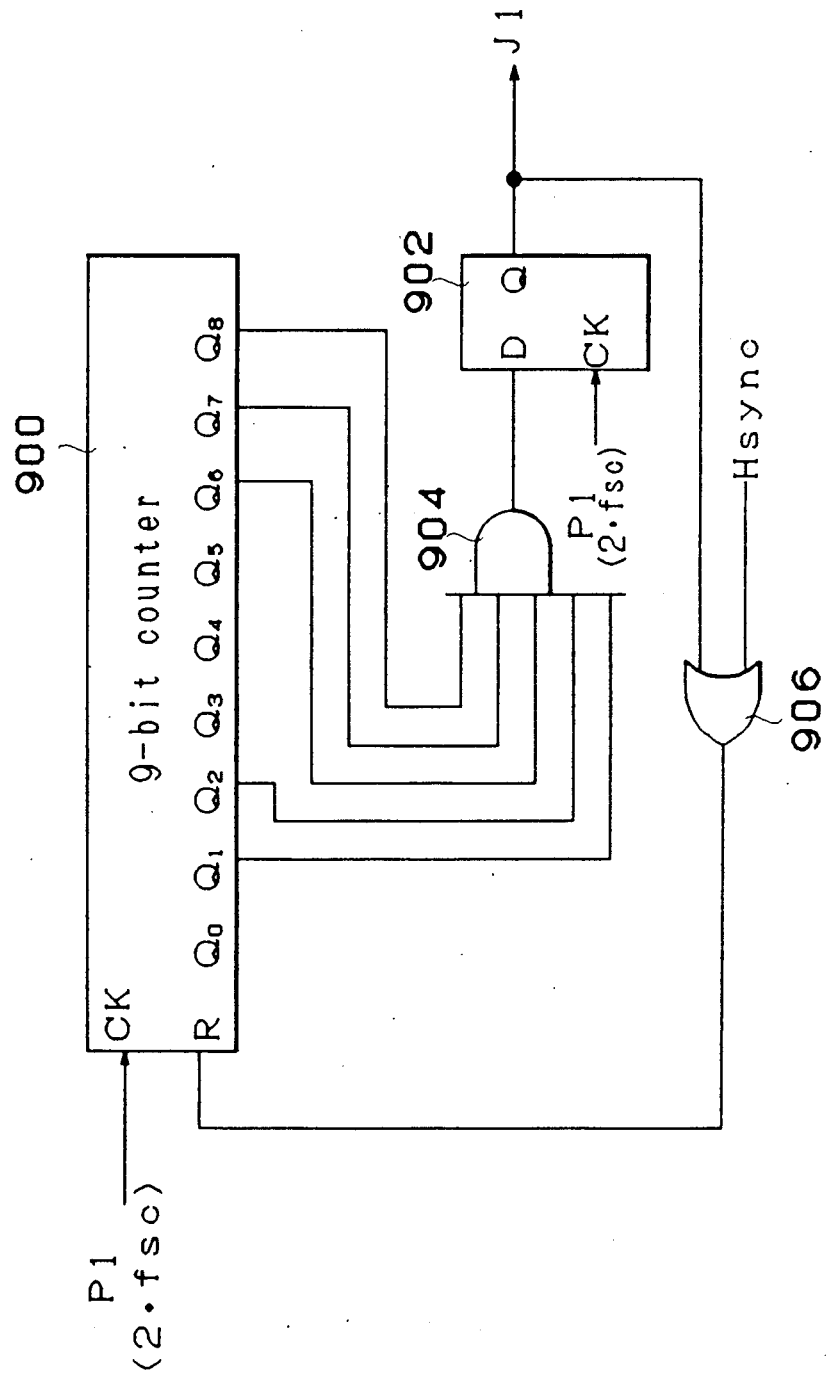
FIG. 4 (A to C) is circuit diagrams showing details of a timing generator 28.

In FIG. 4A, the reference clock P1 is fed into a 9-bit counter 900. The reference clock P1 has, as stated above, the double frequency of frequency $f_{sc}$ of color subcarrier. When superimposing, the reference clock P1 phase-locked to the horizontal sync. pulse of the video signal is given. The 9-bit counter 900 has outputs $Q_0$ to $Q_8$ from the first bit to the ninth bit. The outputs Q1, Q2, Q6, Q7 and Q8 are given to a D flip-flop 902 through an AND 904, and the output Q of the flip-flop 902 is given to the reset input R of the counter 900. Therefore it works as the counter with a base of 455. The reference clock P1 is generated as a signal having a frequency 455 times that of the horizontal sync. pulse, and is phase-locked to the horizontal sync. pulse. Thus, the counter 900 is reset in synchronism with the fall edge of the horizontal sync. pulse $H_{sync}$ of the reproduced video signal.

Figure 4B:
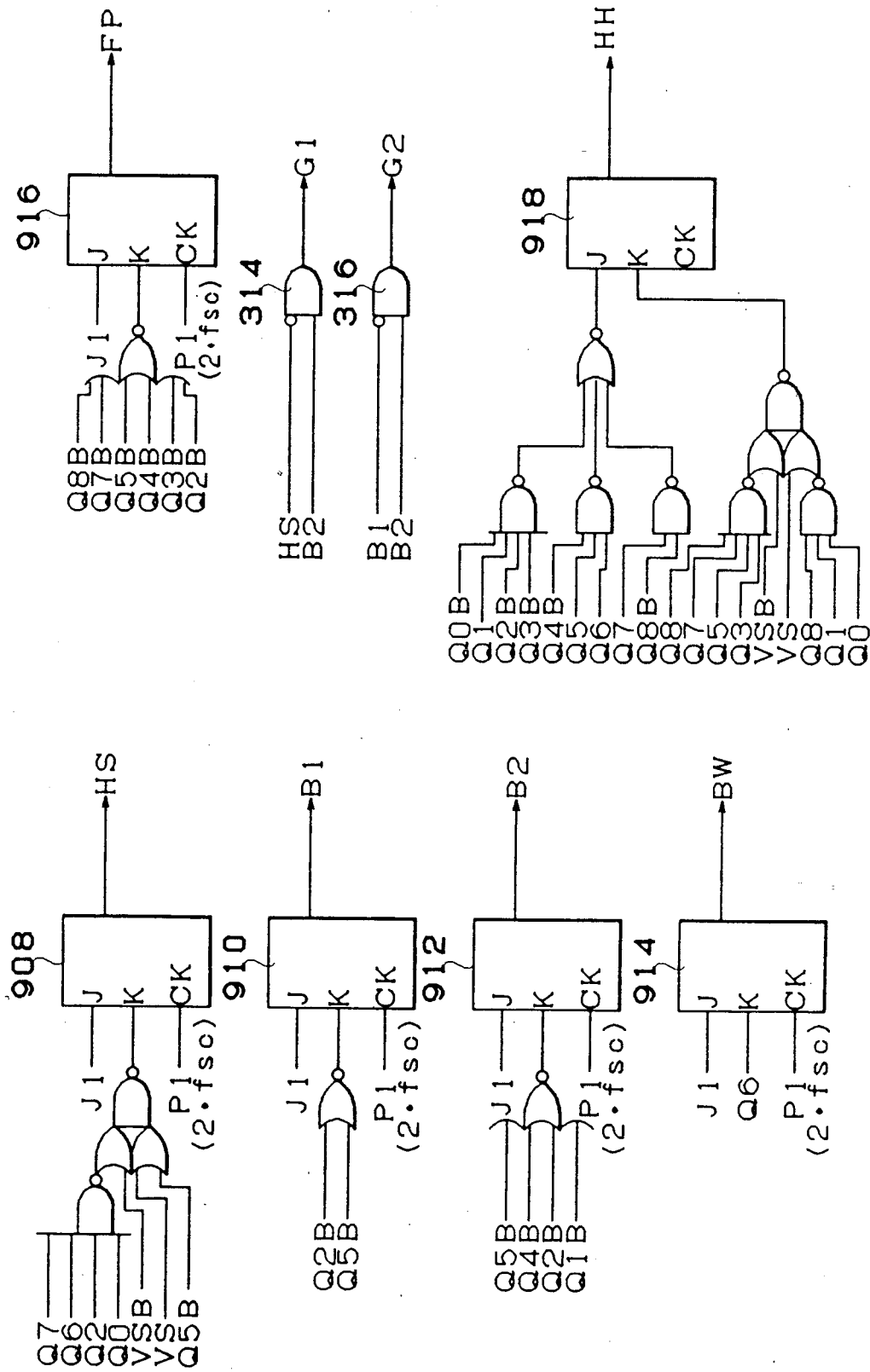
Figure 4C:
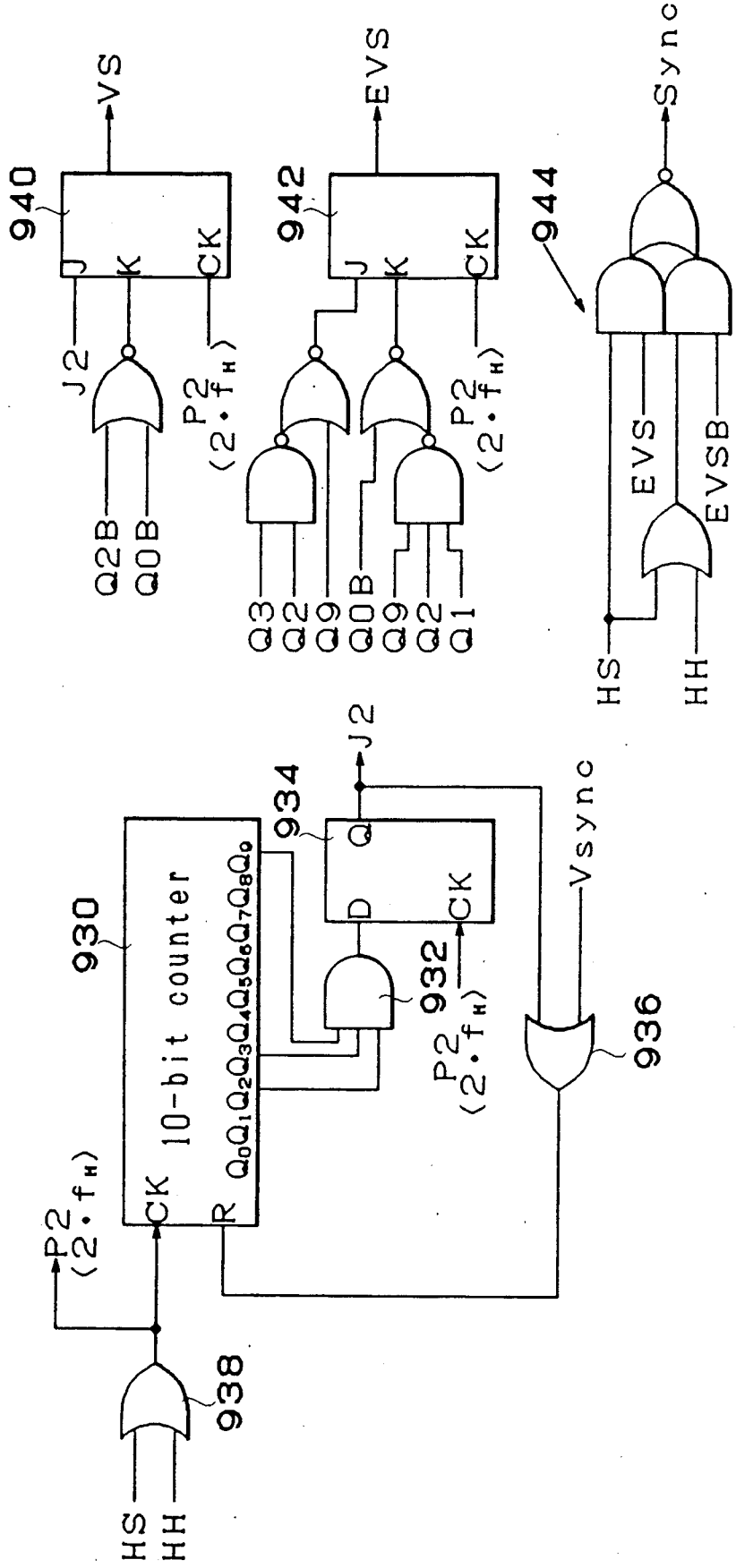
Figure 5A:
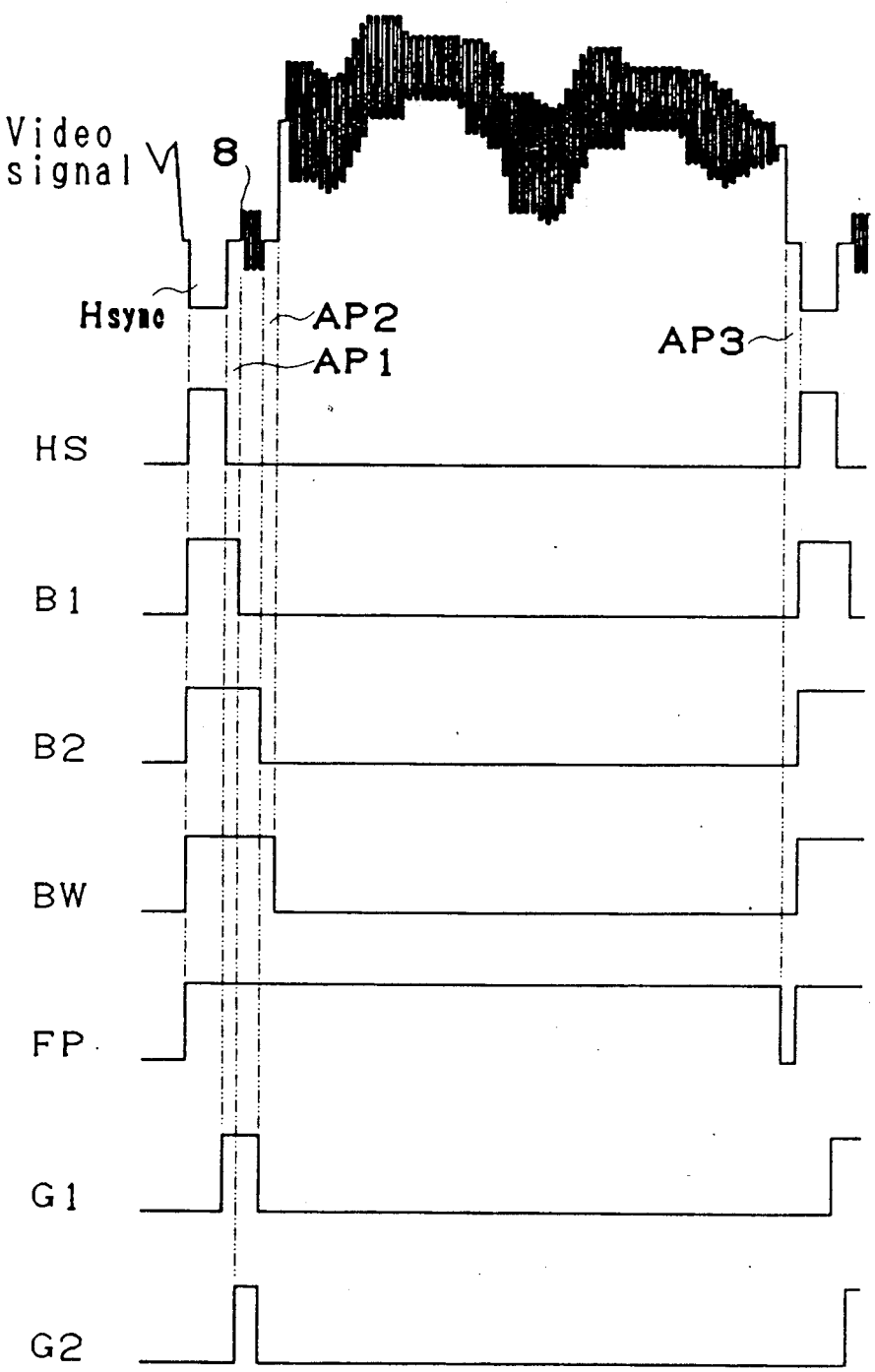
FIG. 5 (A and B) is timing charts for showing the operation of the timing generator 28.

As shown in FIG. 4B, the timing generator 28 obtains necessary timing pulses on the basis of the outputs $Q_0$ to $Q_8$ of stages of this counter 900. A JK flip-flop 908 is set by pulse J1 (the output of D flip-flop 902 in FIG. 4A), and is reset when the output Q5 of the counter 900 becomes H. In other words, the pulse Hs having the width of 4.45 sec. from the fall edge of the horizontal sync. pulse $H_{sync}$ is obtained. The pulse HS is to correspond to the horizontal sync. pulse $H_{sync}$ as shown in FIG. 5A. Similarly, from the flip-flop 910, a pulse B1 having a width of 5 sec. (corresponding to the beginning of burst signal 8) is obtained from the fall edge of the horizontal sync. pulse $H_{sync}$. From the flip-flop 912, a pulse B2 having a width of 7.5 sec. (corresponding to the end of burst signal 8) is obtained. From the flip-flop 914, a pulse BW having a width of 8.9 sec. (corresponding to the beginning of display signal) is obtained. From the flip-flop 916, a pulse FP having a width of 61.7 sec. (corresponding to the end of display signal) is obtained. In the diagram, meanwhile, the one having B attached to the end of a signal name (e.g. Q5B) denotes an inverted signal (e.g. Q5).

The inverted signal of the pulse HS and the pulse B2 are passed through AND gate 314, and a pulse G1 is obtained. The pulse G1 is used for pedestal clamp. The inverted signal of the pulse B1 and the pulse B2 are passed through AND gate 316, and a pulse G2 is obtained. The pulse G2 is used in the burst gate.

Figure 6:
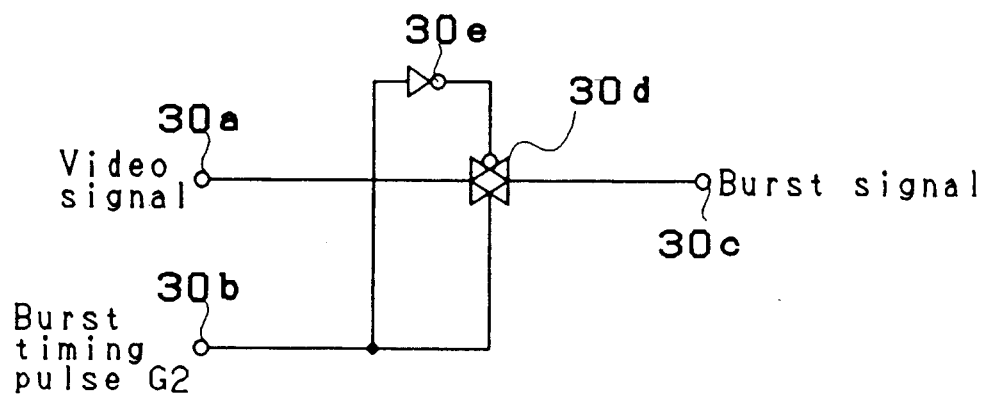
FIG. 6 is a circuit diagram showing a burst gate.
Figure 7:
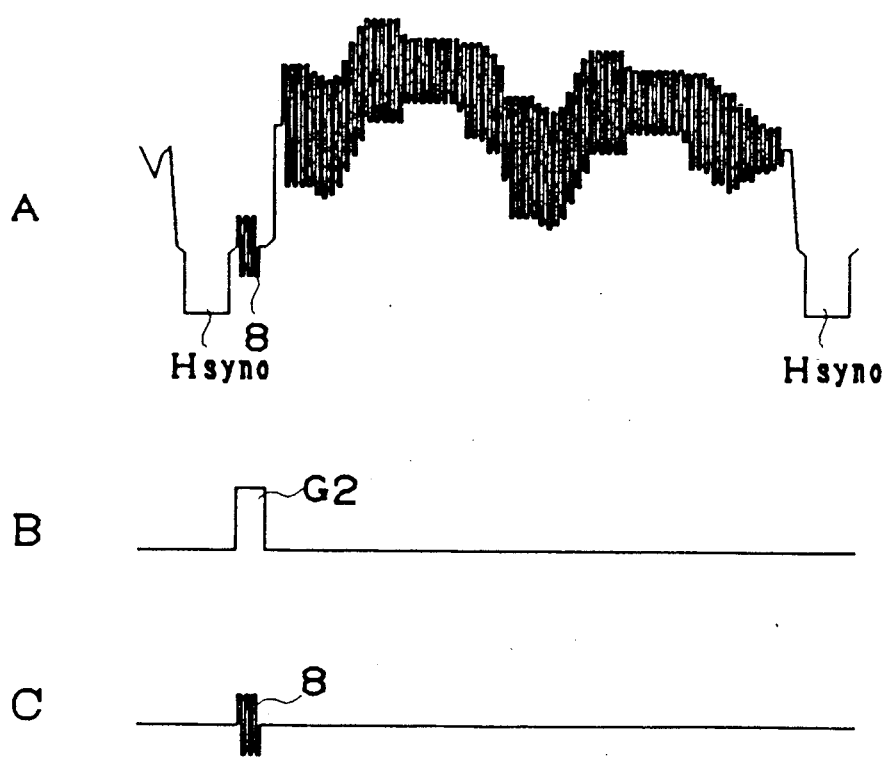
FIG. 7 (A to C) is waveform diagrams showing the operation of the burst gate.

Returning to FIG. 3, the burst gate 30 picks up only the burst signal from the video signal on the basis of the burst timing pulse G2 from the timing generator 28. The details of the burst gate 30 are shown in FIG. 6. A video signal as shown in FIG. 7A is fed into a signal input terminal 30a. On the other hand, to the gate input terminal 30b, the burst timing pulse G2 as shown in FIG. 7B is given. Therefore, the analog switch 30d picks up the signal only in the H period of the pulse G2, and only the burst signal 8 (FIG. 7C) is obtained at an output terminal 30c.

The burst signal 8 is given to a phase detector 32 of a PLL circuit 14 as a first oscillator. The PLL (phase lock loop) circuit 14 comprises the phase detector 32, a low pass filter 33, and a voltage controlled oscillator 34, and generates an oscillation output locked to the phase of the signal fed in the phase detector 32. That is, the PLL circuit 14 generates an oscillation output 80 phase-locked to the burst signal 8.

Figure 8:
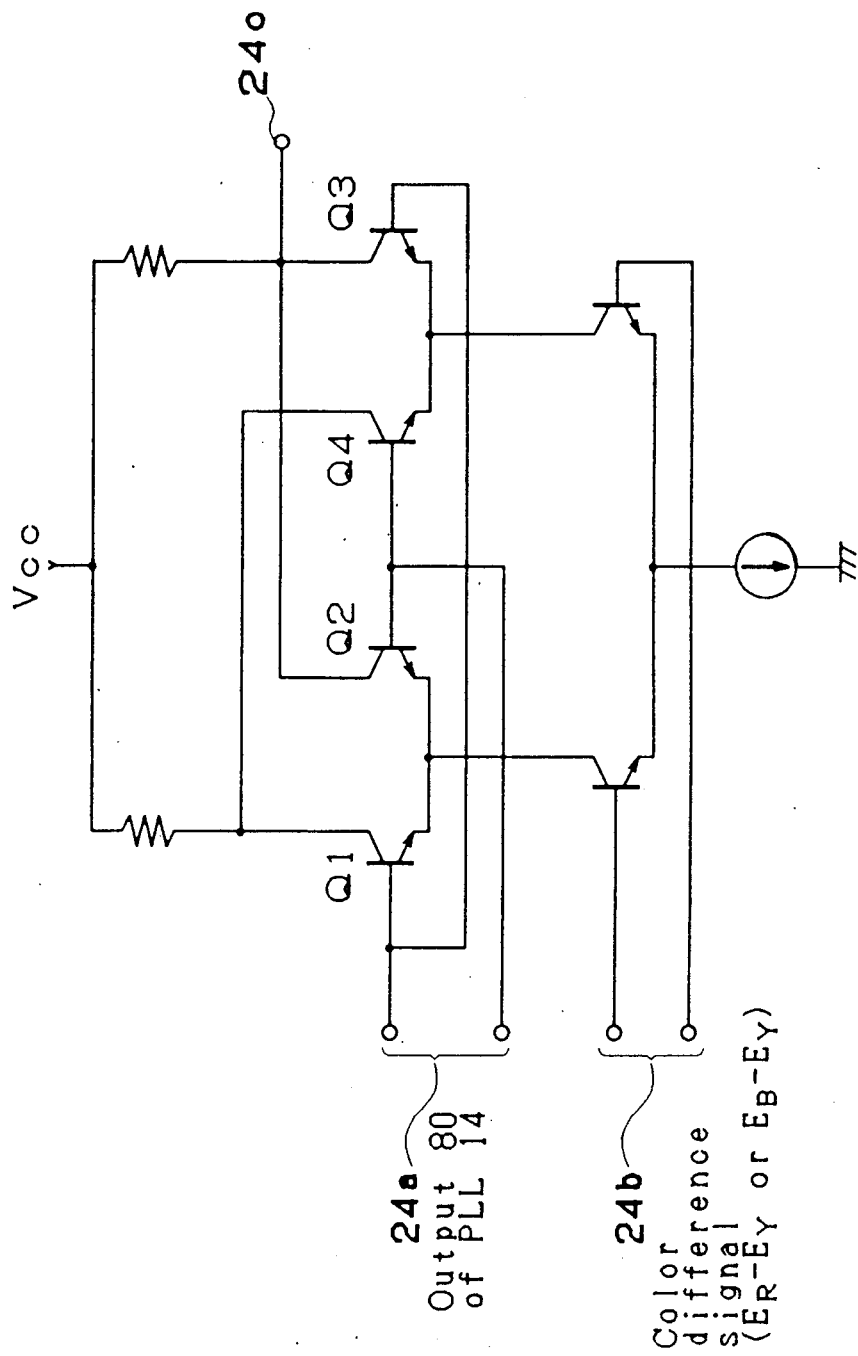
FIG. 8 is a circuit diagram showing a modulator.

The oscillation output 80 is given to the modulator 12. The modulator 12 comprises a first modulator 24 and a second modulator 26. The detail of the modulator 24 is shown in FIG. 8. To the carrier input terminal 24a, the output 80 of the PLL 14 phase-locked to the burst signal 8 is given. To the input terminal 24b of the signal to be modulated, the color difference signal $E_R-E_Y$ of character signal is given. The modulator 26 is also constructed similarly, except that the color difference signal $E_B-E_Y$ having phase difference of 90° to the signal $E_R-E_Y$, is applied on the terminal 24b.

The modulators 24 and 26 carry out a balanced modulation by changing over the transistors Q1 and Q2, and transistors Q3 and Q4, according to the signal from the carrier input terminal 24a. Therefore, from the output terminal 24c, the modulated color difference signal $E_R-E_Y (E_B-E_Y)$ using the output 80 of the PLL 14 as color subcarrier is taken out. That is, the color difference signal $E_R-E_Y$ and color difference signal $E_B-E_Y$ are modulated by the color subcarrier synchronized (phase-locked) with the burst signal of video signal. Incidentally, the color difference signal $E_R-E_Y$ and color difference signal $E_B-E_Y$ are modulated with a phase difference of 90°.

The modulated output 241 of the color difference signal $E_R-E_Y$ and the modulated output 261 of the color difference signal $E_B-E_Y$ are added in an adder 25. To this addition output 251, the luminance signal $E_Y$ is further added in an adder 27, and the sum is given to the changeover device 38 as a modulated character signal 271.

Figure 9:
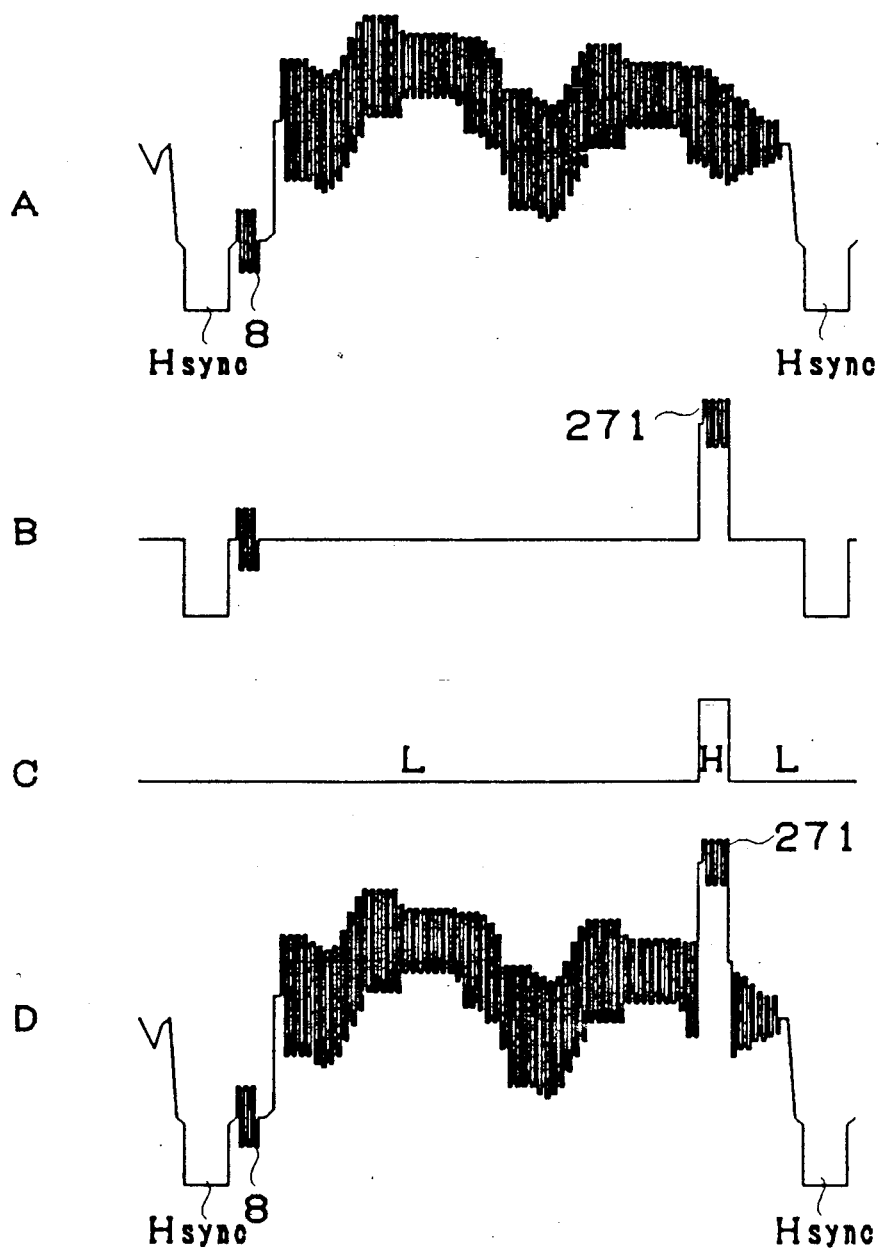
FIG. 9 (A to D) is waveform diagrams showing the operation of the circuit in FIG. 3.

The video signal 100 and the modulated character signal 271 are changed over in the changeover circuit 38. Usually, the video signal 100 is delivered from output OUT, but only when the changeover signal 150 from the changeover signal generator 10 becomes H level, a character signal is delivered. The changeover signal generator 10 is intended to set the changeover signal to H level only in the character insertion period, matching with the character insertion timing. The video signal 100 is shown in FIG. 9A, the modulated character signal 271 is shown in FIG. 9B, and the changeover signal 150 is shown in FIG. 9C.

While the changeover signal 150 is at L level, the reproduced signal 100, including the burst signal 8, is directly delivered from the output OUT. When the changeover signal 150 becomes H level, the modulated character signal 271 is obtained from the output OUT only in this H period. Therefore, from the output OUT, a superimposed output as shown in FIG. 9D is obtained. In this superimposed output, the character signal 271 is modulated by the color subcarrier 80 phase-locked to the burst 8 of the reproduced video signal 100. Therefore, a character having a desired color can be superimposed. Thus, during video reproduction, the time or mode, or message such as "search" or "still" can be displayed in color characters.

Incidentally, in the nonstandard video signal such as VTR reproduction signal, the frequency ratio of the burst signal to horizontal sync. pulse is out of the standard. Therefore, when the display position of the character to be superimposed is controlled on the basis of the burst signal, the character may drift due to the effect such as jitter. In this embodiment, accordingly, the display position is controlled on the basis of the reference clock generated in synchronism with the horizontal sync. signal as stated above.

Figure 10:
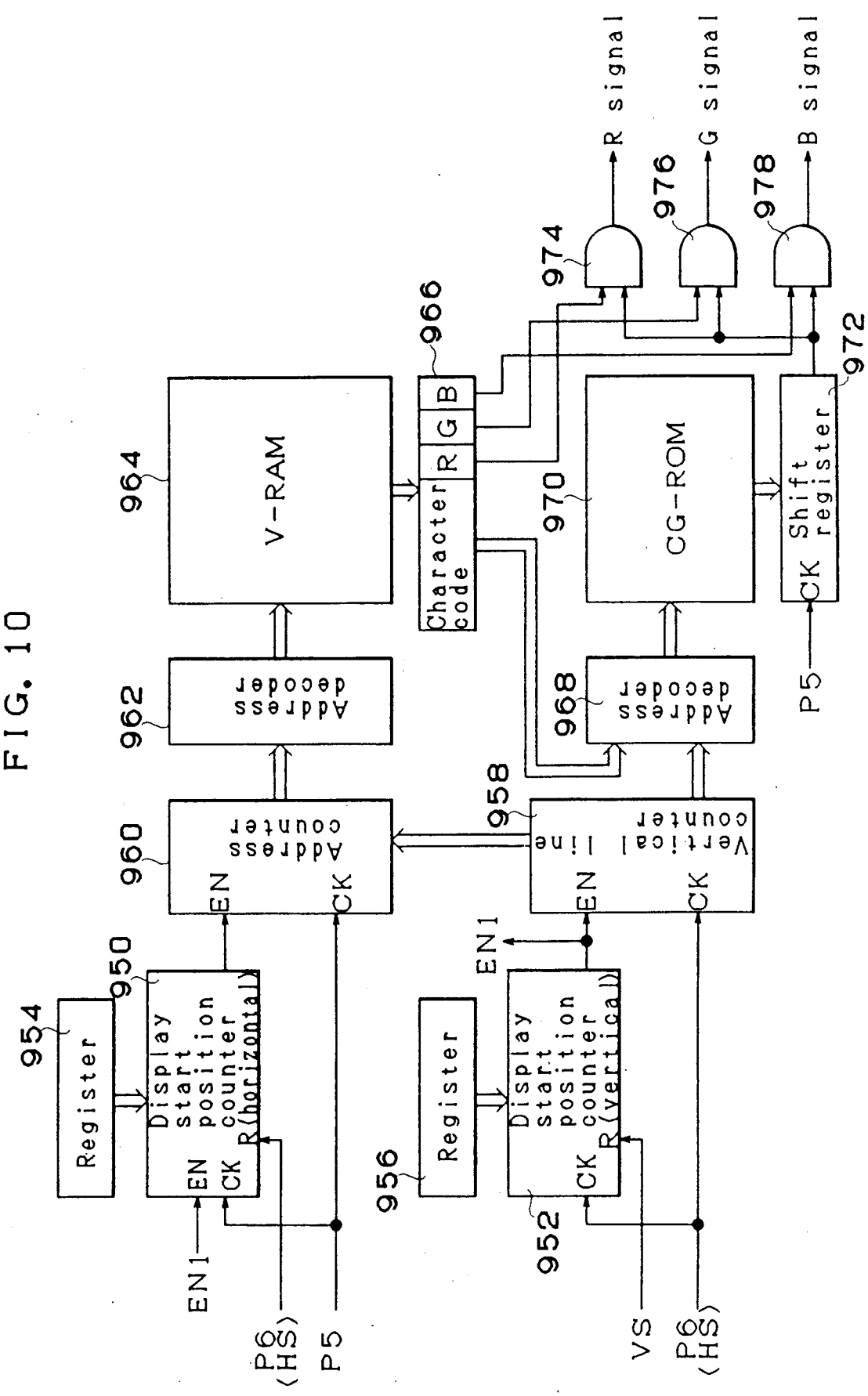
FIG. 10 is a block diagram of a display timing circuit.

A block diagram of a display timing circuit is shown in FIG. 10. Display start position counters 950 and 952 are program counters. The counter 950 counts the pulse P5, and the counter 952 counts the pulse P6. The pulse P5 is obtained by dividing the reference clock P1 by 2, and the pulse P6 is the pulse HS of FIG. 5A (corresponding to the horizontal sync. pulse). That is, the both pulses P5 and P6 are based on the reference clock P1. The counters 950 and 952 are reset when the countings be come equal to the values set in the registers 954 and 956, and issue outputs. The contents of the registers 954 and 956 can be set from a microcomputer or the like (not shown).

First, the counter 952 is reset by the pulse VS (corresponding to the vertical sync. pulse). The counter 952 is provided to set the display start position in the vertical direction according to the content of the register 956. When the counter 952 counts the horizontal sync. pulses HS and reaches the set value of the register (that is, reaching the display start line), it is reset, and issues an output EN1. By the output EN1, the vertical line counter 958 and the counter 950 are ready to operate. The counter 950 is provided for determining the display start position in the horizontal direction according to the content in the register 954. When the counter 950 counts the pulses P5 and reaches the set value of the register 954 (that is, reaching the display start row), it is reset and issues an output. As a result, the address counter 960 starts counting, thereby reading out in the row direction of a display RAM (video RAM) 964. The address in the line direction of the display RAM 964 is given from the vertical line counter 958. After the data of the portion of one line is read out from the display RAM 964, the counter 950 is reset by the horizontal sync. pulse P6, and the counter 952 adds +1 to the counting. That is, from the display RAM 964, the character data (code) and color information are read out into the buffer 966 sequentially in the row direction in each line. The character code being read out is given to CG-ROM 970 through an address decoder 968. From the CG-ROM 970, the bit images of the characters corresponding to the character code are read out to the shift register 972. Meanwhile, since the characters are displayed in plural lines, the vertical line counter 958 outputs the data to show the line number of the characters to the address decoder 968. The bit image data read out to the shift register 972 is serially transmitted by pulse P5. The data are logical producted with the color information data being read out into the buffer 966 by AND gates 974, 976 and 978, and the results are obtained as R signal, G signal and B signal. The R signal, G signal and B signal are given to the input terminals $S_R$, $S_G$ and $S_B$ in FIG. 3. Meanwhile, in the portion where characters are not displayed, the data of "displaying nothing (same as displaying black)" is stored in the display RAM 964.

As mentioned above, the display position of the superimposed character can be controlled. Since the control is effected on the basis of the reference clock generated in synchronism with the horizontal sync. pulse of the reproduced video signal (pulses P5 and P6), the superimposed character does not drift. The pulse P5 is not specifically defined as for as it is in the relation of integer times (including 1) of the frequency of the reference clock P1.

Mode to Display only Added Signal

So far is described a case of superimposing on color video signals. However, when the video signal is a monochromatic signal, there is no burst signal 8, and color character cannot be displayed. Also, when video signal is not fed, color character cannot be displayed.

In this embodiment, the color characters can be displayed even in such cases. When video signal is not fed, the burst signal 8 is also not fed. Therefore, the PLL circuit 14 in FIG. 3 outputs an oscillation output with free-running frequency. The free-running frequency is selected so as to be equal to the frequency $f_{sc}$ of the burst signal. A frequency of the output is doubled in a multiplying circuit 48, and is given to a selector switch 60. In the mode to display only the character signal, the selector switch 60 is connected to the b side. Therefore, the output is delivered from the multiplying circuit 48 as reference clock P1. Hence, on the basis of this reference clock P1, the timing generator 28 is operated. Now, video signal is not given, and hence neither the horizontal sync. pulse $H_{sync}$ nor vertical sync. pulse $V_{sync}$ is fed. Accordingly, the timing generator 28 generates the horizontal sync. pulse $H'_{sync}$ and vertical sync. pulse $V'_{sync}$ by making use of the fact that the frequency $f_H$ of horizontal sync. pulse $H_{sync}$, frequency $f_V$ of vertical sync. pulse $V_{sync}$ and frequency $f_{sc}$ of burst signal are in the following relation.

$$f_{sc} = (455/2) \cdot f_H$$

$$f_{sc} = (1/4) \cdot 455 \cdot 525 \cdot f_V$$

The circuit for generating sync. pulses (part of timing generator 28) is shown in FIG. 4C. The 10-bit counter 930 operates as a 525-based counter by an AND 932, and a D flip-flop 934. To a clock input CK of the counter 932 is fed logical sum of a pulse HS and a pulse HH (OR 938). The pulse HS is the output of the flip-flop 908 of FIG. 4B, and it can be used as the horizontal sync., pulse $H_{sync}$ (frequency $f_H$). The pulse HH is the output of the flip-flop 918 in FIG. 4B, and this output is deviated by a half period phase from pulse HS (see FIG. 5B). Therefore, at the counter 930, the pulse P2 having the double frequency of $f_H$ is fed. The JK flip-flop 940 is set by the pulse J2, and is reset by the count 5 (101). Therefore, the output VS is a pulse having a width of 3H (H is the period of horizontal sync. pulse) (see FIG. 5B). The JK flip-flop 942 is set by the count 12 (1100), and is reset by the count 519 (1000000111). Therefore, the output EVS becomes a pulse having a width of 9H as shown in FIG. 5B. On the basis of these signals, the sync. signals Sync (vertical sync. and horizontal sync. pulses) as shown in FIG. 5B are obtained from the logic circuit 944.

Figure 11:
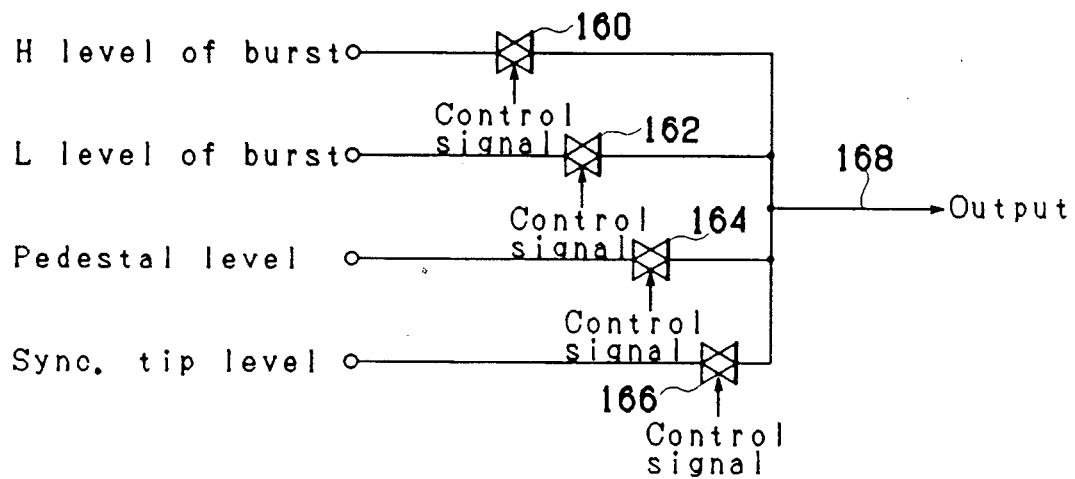
FIG. 11 is a circuit diagram showing details of a burst synchronizing signal generating circuit.

Thus obtained sync. signals Sync are given, togehter with the other outputs of the timing generator 28, to the burst/sync. signal generating circuit 36 as a fundamental signal generating circuit. The detail of the burst-/sync. signal generating circuit 36 is as shown in FIG. 11. Four analog switches 160, 162, 164 and 166 are provided. A voltage of H level of burst (see FIG. 12) is fed to the analog switch 160. A voltage of L level of burst (see FIG. 12) is fed to the analog switch 162. A voltage of pedestal level is fed to the analog switch 164, and a voltage of sync tip level (bottom level of, sync. signal) is fed to the analog switch 166 (see FIG. 12). These analog switches 160, 162, 164 and 166 are designed to close only when a control input becomes H level.

Figure 12:
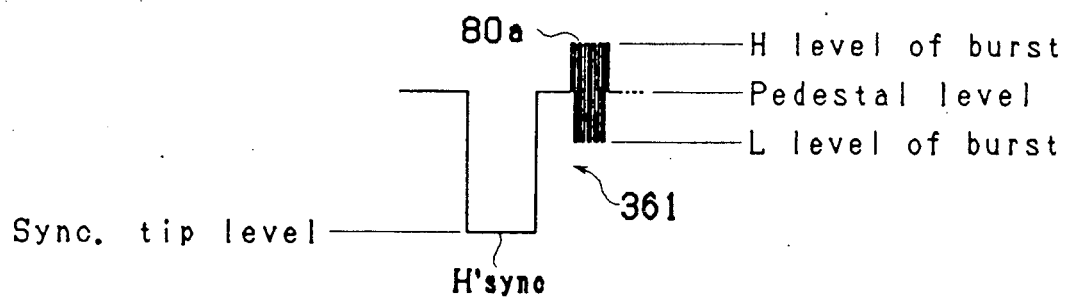
FIG. 12 is a waveform diagram showing the operation of the burst synchronizing signal generating circuit.

To the control input of the analog switch 160, a logical product signal of the burst timing pulse G2 from the timing generator 28 and the output of PLL circuit 14 is given. To the control input of the analog switch 162, a logical product signal of the burst timing pulse G2 from the timing generator 28 and the inverted output of the PLL circuit 14 is given. Therefore, from the output 168, a burst signal 80a as shown in FIG. 12 is obtained.

Furthermore, to the control input of the analog switch 166, the pulse Sync from the timing generator 28 is given. Therefore, as shown in FIG. 12, the horizontal sync. pulse $H'_{sync}$ is generated. The vertical sync. pulse $V'_{sync}$ is similarly formed. To the control input of the analog switch 164, H level is applied only in the period when the display signal is applied, the burst timing pulse G2 is not H and pulse HS is not H. That is, the control signal becoming H only in the periods AP1, AP2 and AP3 shown in FIG. 5A is given. Therefore, a pedestal level is formed.

The burst and sync. signal 361 formed in this way are given to the adder 27.

Figure 1:
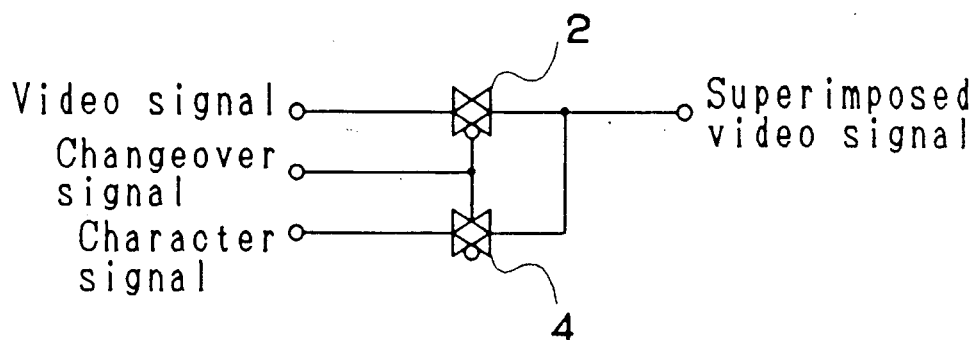
FIG. 1 is a circuit diagram of a conventional superimposing system.
Figure 2:
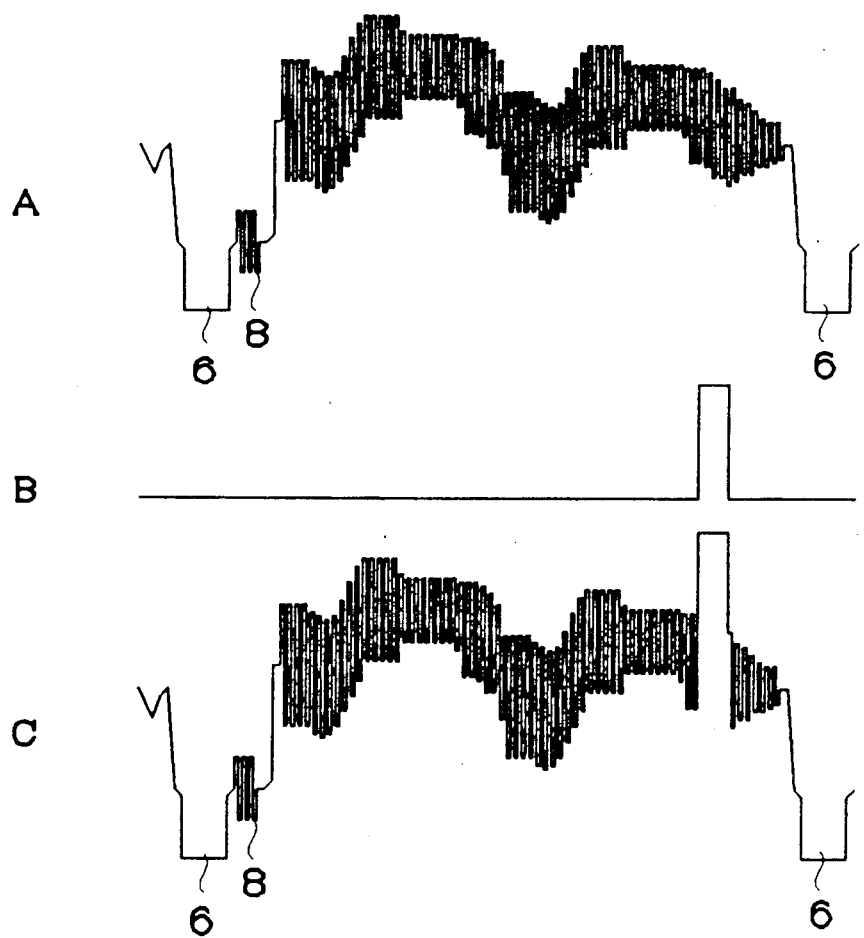
FIG. 2 (A to C) is waveform diagrams of the circuit of FIG. 1.

Meanwhile, when displaying characters while video signal is not given, they are often displayed in the blue background. In this case, the code of displaying solid in blue in the portion other than the characters of V-RAM 964 (FIG. 1) is stored. These signals are converted by the matrix 16 into the luminance signal $E_Y$ and color difference signals $E_R$-$E_Y$ and $E_B$-$E_Y$. The color difference signals $E_R$-$E_Y$ and $E_B$-$E_Y$ are modulated by the modulators 24 and 26, and are added by the adder 25. The added signals are given to the adder 27, and summed up with the luminance signal.

Since the burst and sync. signal 361 are also given to the adder 27 as described above, signals necessary for display are obtained from the output of the adder 27. This signal is taken out through the switch 38 and is delivered. In this case, the switch 38 remains changed over at the output 271 side.

Thus, even when video signal is not fed, the characters can be displayed.

Figure 13:
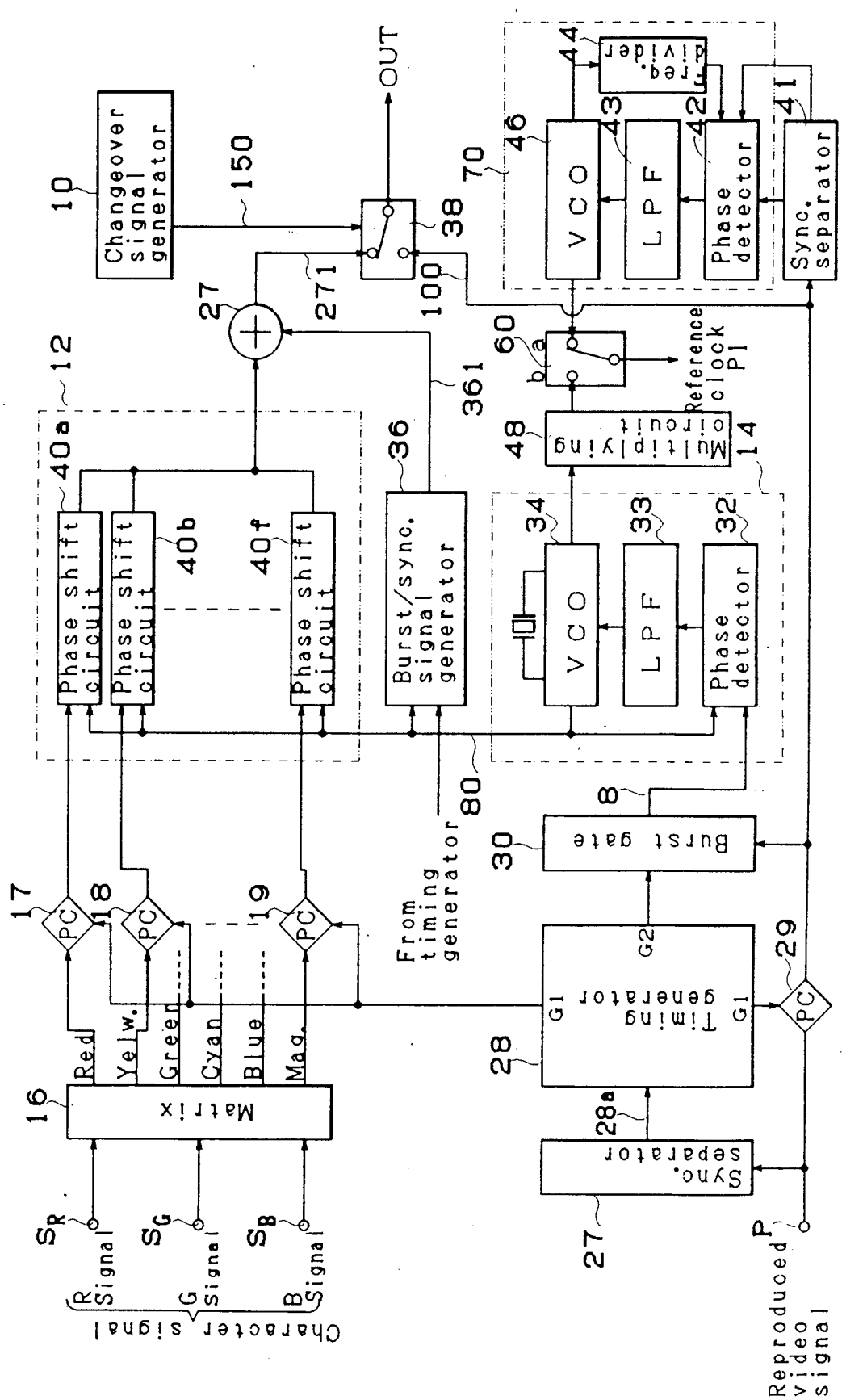
FIG. 13 is a block diagram of a superimposing system of NTSC system in other embodiment of the present invention.

FIG. 13 shows a circuit diagram of a superimposing system in other embodiment of the present invention. In this embodiment, from the matrix 16, R signal, yellow signal, G signal, cyan signal, B signal and magenta signal are delivered, and each signal is modulated in phase shift circuits 40a, 40b, . . . 40f. That is, in this embodiment, the modulator 12 is composed of phase shift circuits 40a, 40b . . . 40f. The other parts are same as in FIG. 3.

PAL System

Figure 14:
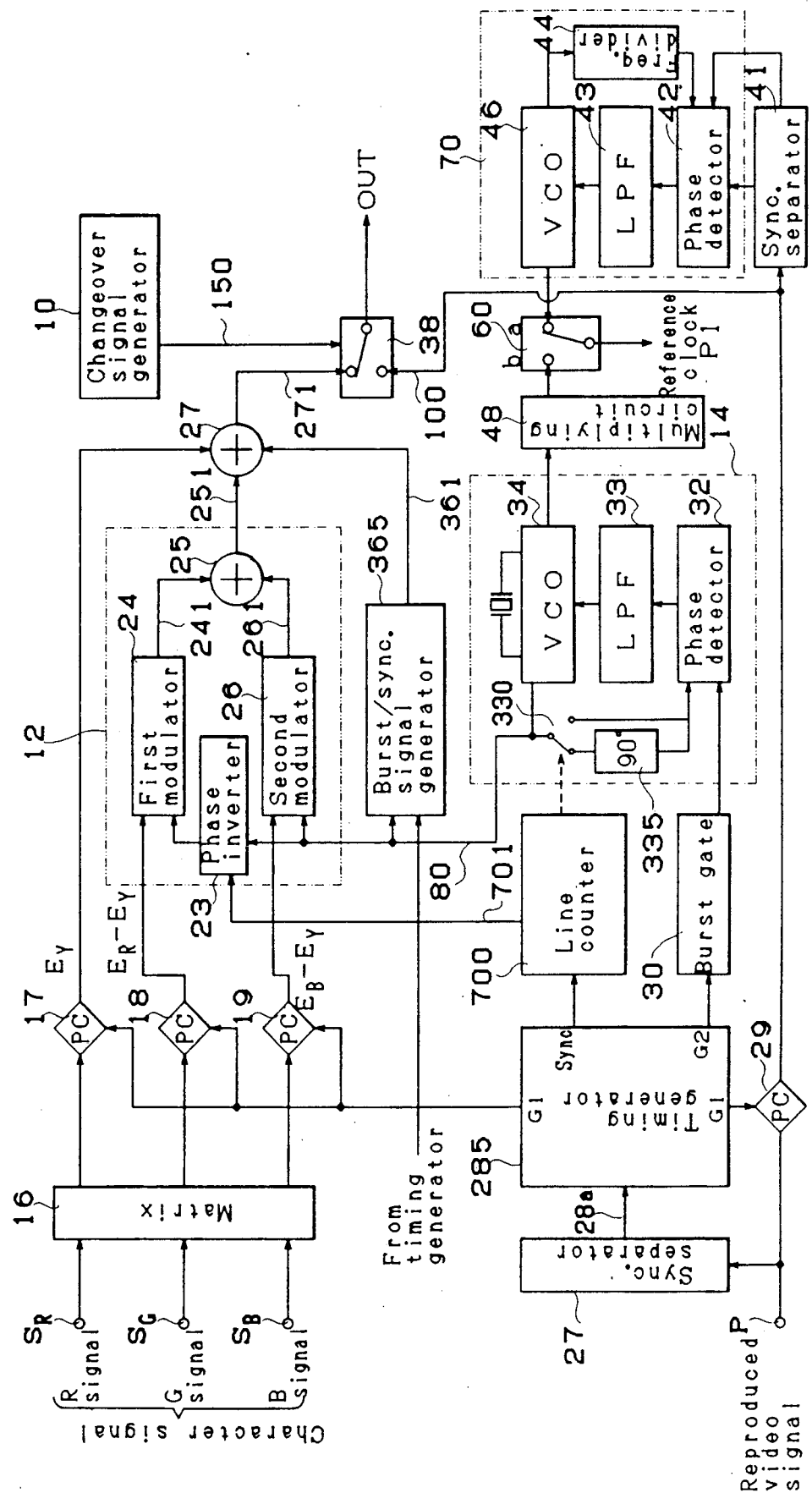
FIG. 14 is a block diagram of a superimposing system of PAL system in an embodiment of the invention.

Next, an embodiment of the present invention applied in the PAL system video signal is shown in FIG. 14. The basic circuit composition is same as in the circuit of FIG. 3. The composition of timing generator 285 is similar to FIGS. 4A, 4B and 4C. However, as for the width of each output pulse, a logic circuit is composed so as to be matched with the video signal of PAL system.

In the PAL system, as shown in FIGS. 15A and 15B, it is specified so as to inverse the phase of the color diference signal $E_R$-$E_Y$ on each line. The burst signal is defined so that the phase difference is $+135°$ or $-135°$ on each line, with respect to the color difference signal $E_B$-$E_Y$.

The timing generator 285 applies a pulse HS corresponding to the horizontal sync. pulse $H_{sync}$ and a pulse VS corresponding to the vertical sync. pulse $V_{sync}$ to a line counter 700 as a line detecting circuit for detecting that a present line is odd line or even line. The line counter 700 is provided with T flip-flop 705 as shown in FIG. 16. The T flip-flop 705 is reset by the pulse VS, and the detection output 701 is changes as H, L, H . . . and so forth by the pulse HS.

By the detection output 701, the changeover switch 330 is changed over by every line. As a result, an output of a voltage controlled oscillator 34 is given to a phase detector 32 as the phase is deviated by 90° by a phase shifter 335, by every other line. Therefore, the phase of the burst signal fed from the burst gate 30 is deviated by 90° on every line, but the PLL circuit 14 generates an oscillation output phase-locked to the burst signal.

The detection output 701 of the line counter 700 is also given to a control input of a phase inverter 23. That is, the phase inverter 23, when L level is given to the control input, gives the output 80 of the PLL circuit 14 directly to a modulator 24, and when H level is given, it inverts the phase of the output 80 of the PLL circuit 14 and gives to the modulator 24. Therefore, the color difference signal $E_R$-$E_Y$ is inverted in phase in each line and modulated.

The modulated outputs 241 and 261 are added by an adder 25, and a luminance signal $E_Y$ is added by an adder 27, and the sum is given to a changeover device 38. Therefore, by setting a changeover signal 150 to H level only in the period of adding the character, a color character can be superimposed. Thus, in the PAL system, too, characters can be superimposed in color.

The circuit for controlling the display position of the superimposing character is the same as the circuit used in the NTSC system, that is, the circuit in FIG. 10. Therefore, the superimposed characters can be displayed without drift.

Figure 17:
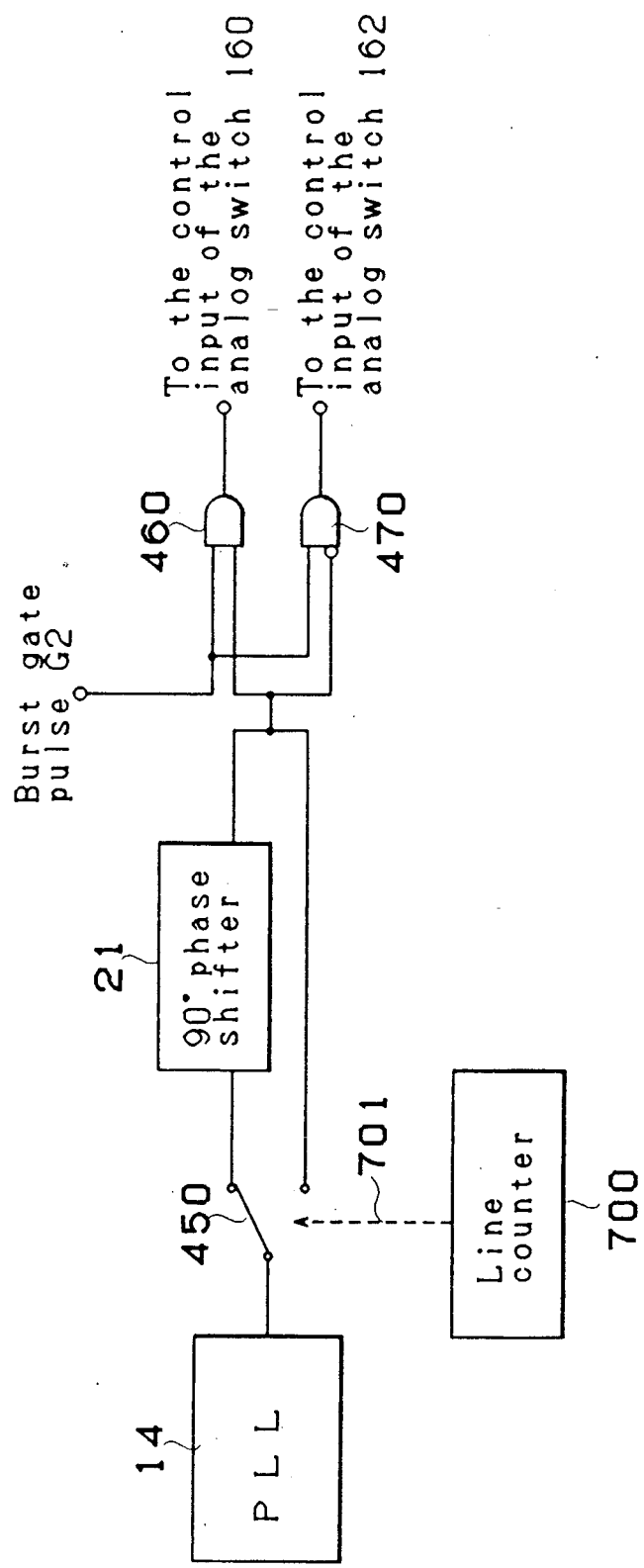
FIG. 17 is a diagram showing details of a part of a burst synchronizing signal generating circuit 365.

As explained in the NTSC system, there are some cases that it necessary to obtain to display the characters while video signal is not fed. In this case, same as in the NTSC system, on the basis of the output 80 of the PLL circuit 14 and the output of the timing generator 285, burst signal and sync. signal can be generated. The circuit for this purpose is same as in FIG. 11. In the PAL system, however, the phase of the burst signal must be changed by 90° in every line. Therefore, on the basis of the output of the line counter 700, the control signals to be given to the analog switches 160 and 162 are shifted by 90° in every other line. That is, the control signal is generated by using a circuit as shown in FIG. 17. By the detection output 701 of the line counter 700, the switch 450 is changed over in every line. As a result, the output of the PLL circuit 14 passes through the phase shifter 21 in every other line so as to be shifted by 90°. Therefore, the control signals to the analog switches 160 and 162 are shifted by 90° in every other line.

Other Embodiments

In the foregoing embodiments, meanwhile, character signals were used as the added signals to be superimposed, but graphic signals or other signals can be also used. Further, as the color difference signals, the so-called $E_I$ signal, $E_Q$ signal can be also used.

The reproduction mode is described herein, but when recording, the remainder of the tape or battery capacity can be superimposed also in color on a monitor (or a finder of video camera). For example, when the tape remainder runs short, due caution can be alerted by displaying in a warning red color.

In the case of title, date and other information that must be recorded, the superimposed signals can be recorded, so that they can be recorded as color superimposed signals.

In the superimposing system of this invention, the added signal is modulated by the color subcarrier phase-locked to the burst signal of the video signal. Therefore, a character having a desired stable color can be superimposed.

Besides, by the reference clock phase-locked to the horizontal sync. pulse of video signal, the display position of the added signal is controlled. Therefore, even on a nonstandard video signal, superimposing can be carried out without drift of character.

Furthermore, by the reference clock selecting means, the output of the second oscillation circuit is used as the reference clock when superimposing, and the free-running oscillation output of the first oscillation circuit is used as the reference clock when not superimposing. Therefore, even when the video signal is not fed, the reference clock can be obtained. Furthermore, when displaying the added signal only, on the basis of the free-running oscillation output of the first oscillation circuit, burst signal, horizontal sync. pulse and vertical sync. pulse are generated. Hence, even when video signal is not fed, the added signal can be displayed. That is, it is possible to superimpose in a desired color without drift, and even when video signal is not fed, the added signal can be displayed in a desired color.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A superimposing system comprising:
   a first oscillation circuit for generating a free-running oscillation output when a burst signal of a video signal is not fed, and generating an oscillation output, when the burst signal of the video signal is fed, phase-locked to the burst signal,
   a second oscillation circuit for generating an output where a frequency divided signal of the output is phase-locked to a horizontal synchronizing signal of the video signal,
   a modulator for modulating an added signal, using the output of the first oscillation circuit as a color subcarrier,
   reference clock selecting means for selecting the output of the second oscillation circuit as a reference clock when adding an information signal to the video signal, and selecting the output of the first oscillation circuit as the reference clock when not adding an information signal to the video signal,
   a foundation signal generating circuit for generating a burst signal, a horizontal synchronizing signal and a vertical synchronizing signal on the basis of the free-running oscillation output of the first oscillation circuit when displaying only the added signal on a display means,
   a display timing circuit for controlling the display position of the added signal on the basis of the reference clock, and
   means for changing over the modulated added signal and the video signal.

2. A superimposing system in accordance with claim 1, further comprising:
   a generating circuit of added color difference signals for generating at least first and second added color difference signals, and
   said modulator modulates the first and the second added color difference signals.

3. A superimposing system in accordance with claim 1, wherein:
   said video signal is of a NTSC system.

4. A superimposing system in accordance with claim 1, wherein:
   said video signal is of a PAL system.

5. A superimposing system in accordance with claim 4, further comprising:
   a generating circuit of added color difference signals for generating at least first and second added color difference signals by feeding an added signal, and said modulator modulates the first and second added color difference signals.

6. A superimposing system in accordance with claim 5, which further comprises:

a line detecting circuit for generating a detection output by detecting normal or reverse phase in every line of the burst signal of the PAL video signal, and said modulator comprises a first modulation circuit for modulating the first added color difference signal on the basis of the output of the first oscillation circuit, and a second modulation circuit for modulating the second added color difference signal by the output of the first oscillation circuit which is phase inverted in every line on the basis of the output of said line detecting circuit.

7. A superimposing system in accordance with claim 6, wherein:

said first oscillation circuit comprises:

a voltage controlled oscillator and a phase detector in which a burst signal is fed as one input thereof, and the output of the voltage controlled oscillator is shifted in phase by 90° in every line on the basis of the detecting output of the line detecting circuit, and is fed as another input of the phase detector.

8. A superimposing system comprising:

a matrix for obtaining a first color difference signal, a second color difference signal and a luminance signal, a burst gate for taking out a burst signal of a video signal when the video signal is fed, phase locked to the burst signal, a first PLL circuit having a phase detector which receives the output from said burst gate as one input, and receives an output from a voltage controlled oscillator as another input, a synchronous separating circuit for taking out a horizontal synchronizing signal from the video signal, a second PLL circuit having a phase detector which receives the output from said synchronous separating circuit as one input, and receives a predetermined frequency divided signal of an output of a voltage controlled oscillator as another input, first and second added color difference signal modulators for modulating first and second added color difference signals, using the output of the voltage controlled oscillator of the first PLL circuit as color subcarrier, an adder for adding the modulated color difference signals and the luminance signal to obtain a modulated added signal, reference clock selecting means for selecting the output of the second PLL circuit as a reference clock when adding an information signal to the video signal, and selecting the output of the first PLL circuit as the reference clock when not adding an information signal to the video signal, a foundation signal generating circuit for generating a burst signal, a horizontal synchronizing signal and a vertical synchronizing signal on the basis of the free-running oscillation output of the first PLL circuit when displaying only the added signal on a display means, a display timing circuit for controlling the display position of the added signal, using the output of the voltage controlled oscillator of the second PLL circuit as the reference clock, and means for changing over the modulated added signal and the video signal, on the basis of a changeover signal.

9. A superimposing system in accordance with claim 8 wherein:

said video signal is of an NTSC system.

10. A superimposing system in accordance with claim 8 wherein:

said video signal is of a PAL system.

11. A superimposing system in accordance with claim 10, which further comprises:

a line detection circuit for generating a detection output by detecting normal or reverse phase in every line of the burst signal of the PAL video signal, said first modulator modulates the first added color difference signal on the basis of the output of the first PLL circuit, and said second modulator inverts the phase of the output of the oscillation circuit in every line of the burst signal on the basis of the output from said line detection circuit, and modulates the second added color difference signal.

12. A superimposing system comprising:

a matrix for obtaining a first color difference signal, a second color difference signal and a luminance signal, a burst gate for taking out the burst signal of a PAL video signal when the PAL video signal is fed, phase locked to the burst signal, a first PLL circuit having a phase detector which receives the output from said burst gate as one input, and receives an output from a voltage controlled oscillator as another input, said first PLL circuit comprises a voltage controlled oscillator and a phase detector having the burst signal as an input thereof, the output of the voltage controlled oscillator is shifted in phase by 90° on the basis of a detection output of a line detecting circuit, and feeds to another input of the phase detector, a synchronizing separating circuit for taking out a horizontal synchronizing signal from the PAL video signal, a second PLL circuit having a phase detector which receives the output from said synchronous separating circuit as one input, and receives a predetermined frequency divided signal of an output of a voltage controlled oscillator as another input, first and second added color difference signal modulators for modulating first and second added color difference signals, using the output of the voltage controlled oscillator of the first PLL circuit as color subcarrier, said first modulator modulates the first added color difference signal on the basis of the output of the first PLL circuit, an adder for adding the modulated color difference signals and the luminance signal to obtain a modulated added signal, said line detecting circuit generating said detection output by detecting normal or reverse phase in every line of the burst signal of the PAL video signal, reference clock selecting means for selecting the output of the second PLL circuit as a reference clock when adding an information signal to the PAL video signal and selecting the output of the first PLL circuit as the reference clock when not adding an information signal to the PAL video signal, a foundation signal generating circuit for generating a burst signal, a horizontal synchronizing signal and a vertical synchronizing signal on the basis of the free-running oscillation output of the first PLL circuit when displaying only the added signal on a display means, a display timing circuit for controlling the display position of the added signal, using the output of the voltage controlled oscillator of the second PLL circuit as the reference clock, and means for changing over the modulated added signal and the PAL video signal, on the basis of a changeover signal.

* * * * *